United States Patent
Shevket

(10) Patent No.: US 7,814,999 B2
(45) Date of Patent: Oct. 19, 2010

(54) HYDRAULIC TRACTION SYSTEM FOR VEHICLES

(76) Inventor: Alper Shevket, The Ridgeway House, Gladstone Avenue, Ramsey, Isle of Man, IM 82LB (GB)

(*) Notice: Subject to any disclaimer, the term of this patent is extended or adjusted under 35 U.S.C. 154(b) by 359 days.

(21) Appl. No.: 12/070,120

(22) Filed: Feb. 15, 2008

(65) Prior Publication Data

US 2008/0202842 A1 Aug. 28, 2008

(51) Int. Cl.
*B60K 17/30* (2006.01)
(52) U.S. Cl. .................. 180/6.3; 180/6.48; 418/15; 418/82
(58) Field of Classification Search .................. 180/6.3, 180/6.48, 202, 224, 242, 53.4, 307, 215, 180/219; 418/15, 82, 61.1, 267
See application file for complete search history.

(56) References Cited

U.S. PATENT DOCUMENTS

| | | | | |
|---|---|---|---|---|
| 2,056,910 A | * | 10/1936 | Schauer | 418/215 |
| 2,992,712 A | * | 7/1961 | McGill | 60/435 |
| 3,054,357 A | * | 9/1962 | McGill | 418/77 |
| 3,418,886 A | * | 12/1968 | Brundage | 91/339 |
| 3,560,118 A | * | 2/1971 | Palachik | 418/26 |
| 3,787,150 A | * | 1/1974 | Sarich | 418/61.1 |
| 4,137,989 A | * | 2/1979 | Rehfeld | 180/428 |
| 4,822,265 A | * | 4/1989 | Johnson et al. | 418/182 |
| 5,626,032 A | * | 5/1997 | Neblett | 418/219 |
| 6,481,990 B2 | * | 11/2002 | Wong et al. | 418/82 |

* cited by examiner

*Primary Examiner*—Hau V Phan
(74) *Attorney, Agent, or Firm*—Eugene E. Renz, Jr.

(57) ABSTRACT

A hydraulic traction system for vehicles is described. The system comprises a hydraulic vane motor mounted at each wheel of the vehicle, and equal number of identical hydraulic vane motors operated as engine driven pumps, and a control system for regulating the flow and direction of hydraulic oil during operation. The hydraulic motor is of a novel design that has a hollow non-drive shaft that accepts incoming hydraulic oil, this allows internal components of the hydraulic motor to be arranged in such a way to improve the efficiency of the hydraulic traction system.

3 Claims, 17 Drawing Sheets

Key to Symbols

3 WAY VALVE (WITH MANUAL SHIFT HANDLE BEHIND STEERING WHEEL)

AT PARK POSITION

AT DRIVE POSITION

FULL FLOW TO BYPASS          FULL FLOW TO WHEEL MOTORS

HYDRAULIC TRACTION SYSTEM FOR VEHICLES

This application claims the benefit of U.S. patent application Ser. No. 11/232,814 filed Sep. 22, 2005, which claims the benefit of U.S. Provisional Application No. 60/612,212 filed Sep. 23, 2004.

FIELD OF INVENTION

This invention relates to land vehicles, and more particularly to vehicles utilizing hydraulic drive motors to drive the wheels.

BACKGROUND OF INVENTION

Hydraulic wheel motors have been used on various automotive and non-automotive types of vehicles. In particular, hydraulically driven vehicles have achieved a fair degree of commercial success in farm vehicles.

These hydraulic wheel motors are provided with a rotary member and a stationary member having a plurality of cavities for pumping hydraulic oil which periodically varies in displacement as the stationary and the rotary member move relative to one another. Hydraulic oil from an engine driven pump is supplied to the hydraulic wheel motors for propelling the vehicle.

A vehicle that is solely driven by hydraulics has the advantage of eliminating mechanical drive train components such as a conventional transmission, clutches, and driveshaft. However, while a vehicle of this type has been used in slower moving farm or off road vehicles, various challenges exist to provide a mainstream hydraulically driven vehicle.

In particular, normal driving situations put various stresses on a hydraulic system that can lessen the driving experience. Furthermore, conventional vane-based hydraulic motors are not efficient enough to provide ideal power in an economical manner. Since vehicles with hydraulic power trains between the engine and the wheels have various advantages, such as not requiring a conventional drive train, it is desirable to make an improved vehicle that has the aforementioned advantages over a vehicle with a conventional drive train.

SUMMARY OF THE INVENTION

The present invention provides a hydraulic traction system for vehicles. In a preferred embodiment, the system comprises a hydraulic vane motor mounted at each wheel of the vehicle (herein after wheel motors), and equal number of identical units installed as engine driven pumps for volumetric sufficiency without excess flow while cruising; and a control system for regulating the flow and direction of hydraulic oil during operation. It is desirable to have an efficient hydraulic wheel motor to provide the power to the wheels. The present invention provides a hydraulic motor in which the incoming hydraulic oil (sometimes referred to as hydraulic fluid) comes through a main oil gallery in the center of the rotating shaft, and arrives at the chambers via distribution galleries of the rotor; shaft and rotor being a single component; which delivers the oil immediately behind the moving vanes in chamber. Hence there is no need for inlet ports to the chambers. The hydraulic motor provided by the present invention requires no radial inlet ports or radial discharge ports. Such radial or axial inlet and discharge ports would substantially reduce the displacement angle of chamber, reducing the volume of chambers swept while the incoming oil is actually driving the vanes.

The discharge ports from chambers in this invention carry the flow to the outlet galleries without change of direction of flow, thus preventing turbulence and cavitations at chamber exit. Further prevention of cavitations down stream of chamber is achieved by slowing down oil flow within the discharge ports, which are 27% larger in cross-section than the cross-section of distribution gallery, and further slowed down in the outlet galleries, which has a 37% larger combined cross-section then the cross-section of the main oil gallery. The prevention of cavitations by this design also works in reverse when the unit is in pump application. Therefore, the design of hydraulic motor provided by the present invention provides improved power and efficiency.

In a preferred embodiment, the aforementioned hydraulic motor is mounted at each wheel of a vehicle. However, it is possible to have a configuration system where only some of the wheels are powered by a hydraulic motor. In the preferred embodiment, the hydraulic traction system for vehicles is a system of hydraulic transmission of the engine power output to the wheels; where a hydraulic motor at each wheel translates that power to torque and speed at the wheels. This eliminates the entire mechanical power train between engine and wheels of conventional transmission systems; replacing it with an entirely hydraulic transmission system, which provides an infinitely variable speed and torque relationship; resulting in optimum smooth drive, totally free from effects such as that of changing gears, even with automatic transmission; and displaying optimum performance of the vehicle with higher efficiency.

The major components of the hydraulic traction system for vehicles, namely the hydraulic motor, and the control system, will now be illustrated and described in detail.

DETAILED DESCRIPTION OF THE PREFERRED EMBODIMENTS

Figure 1A:
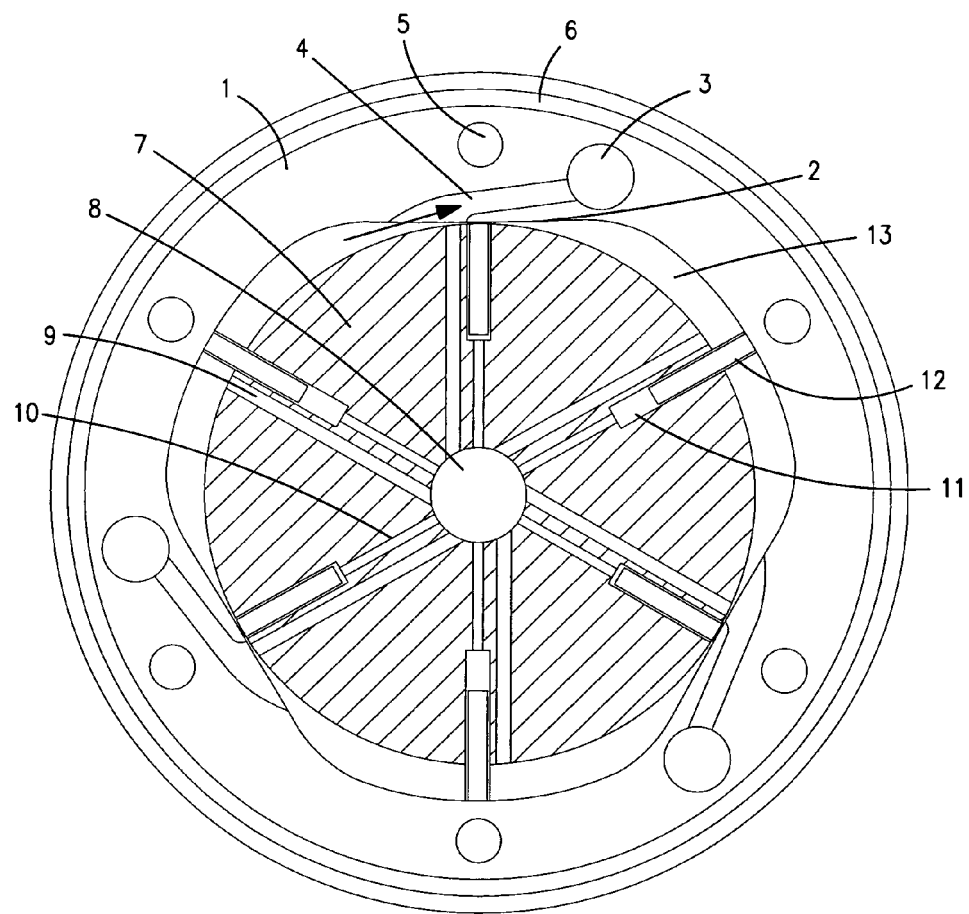
FIG. 1a is an internal view of the hydraulic motor of the present invention.
Figure 1B:
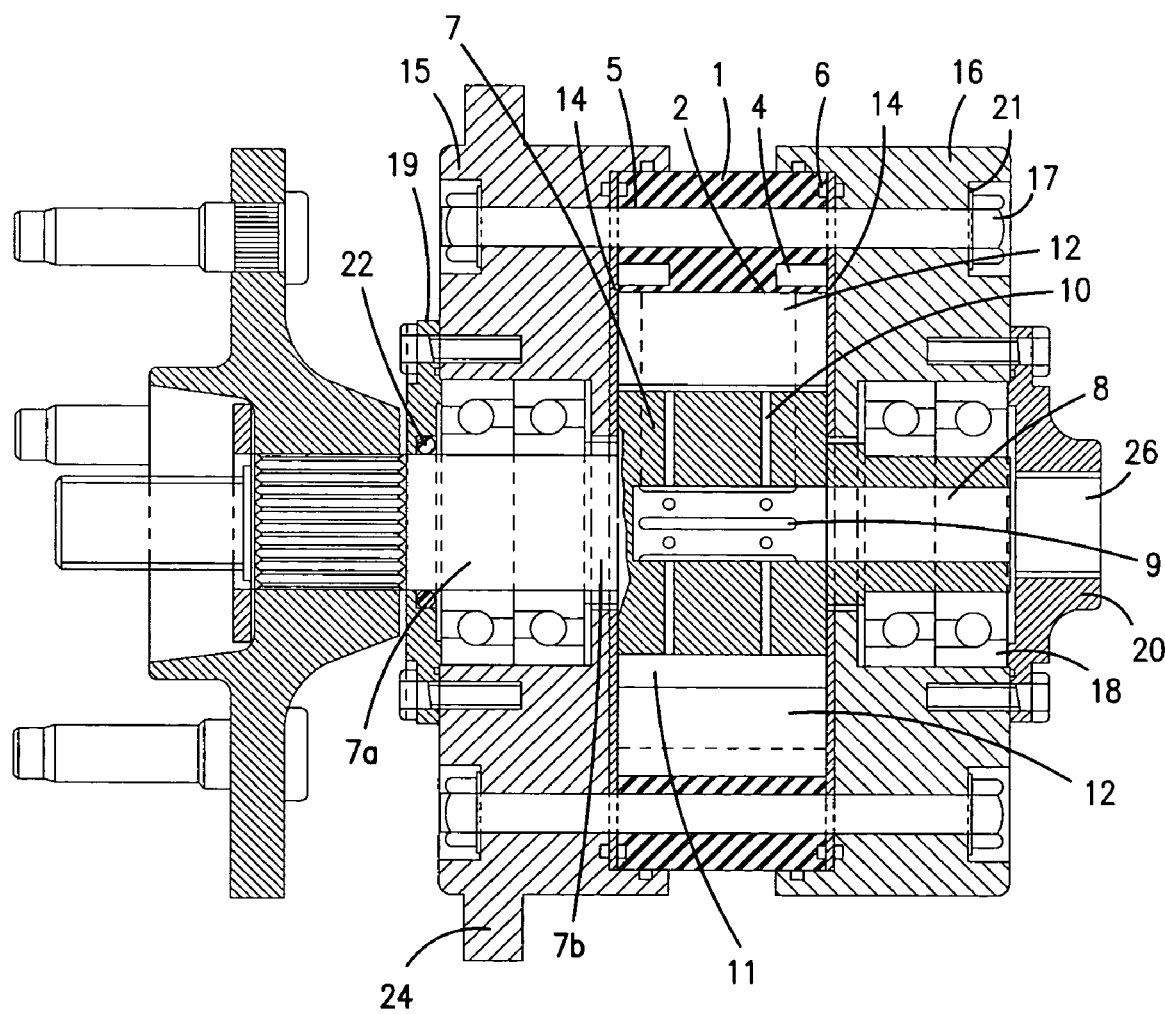
FIG. 1b is a cutaway view, along the drive axis, of the hydraulic motor of the present invention.
Figure 1C:
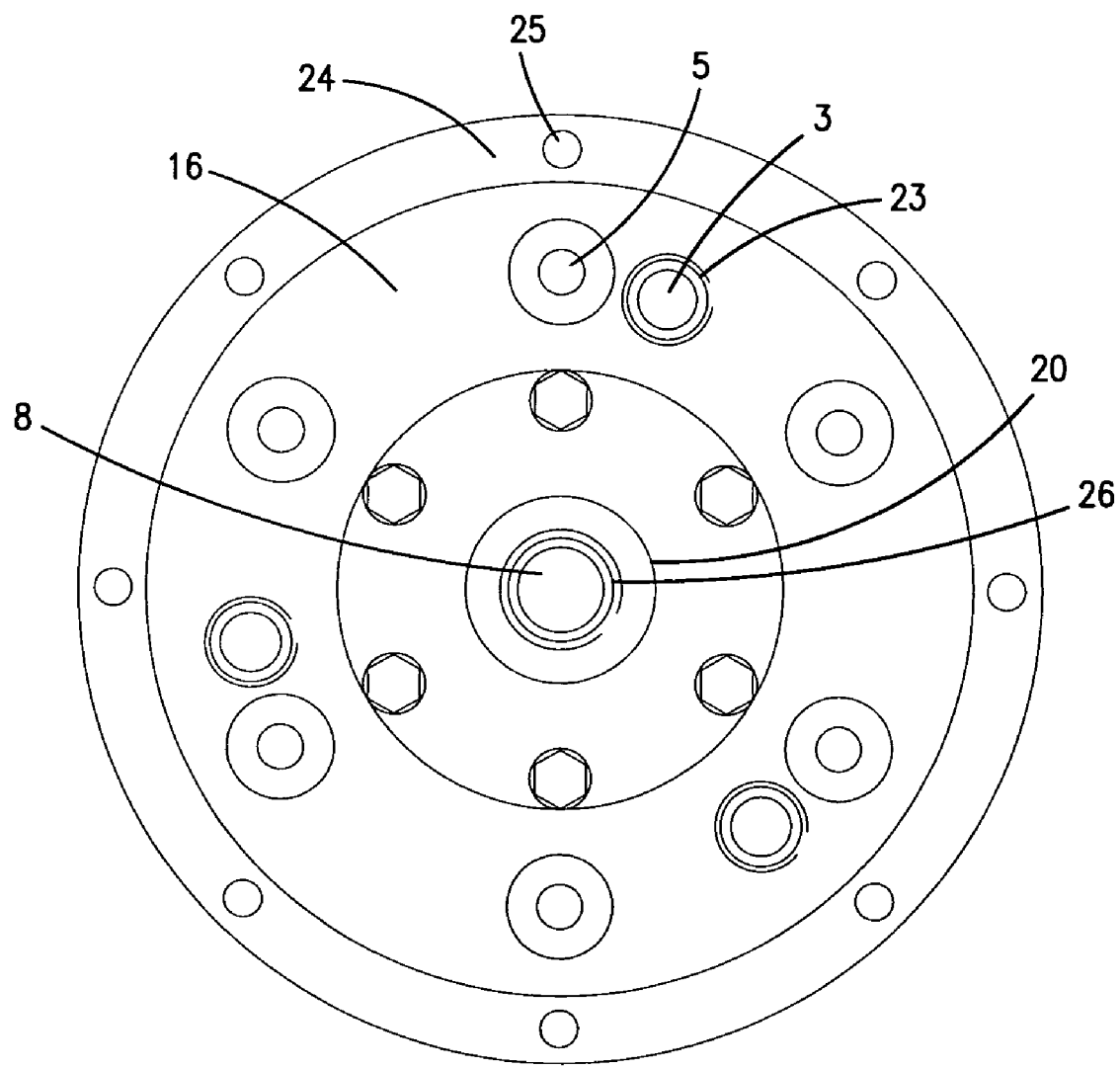
FIG. 1c is a view of the non-drive end of the hydraulic motor of the present invention.

Referring now to FIGS. 1A, 1B and 1C, the hydraulic motor of the present invention will now be described. The hydraulic motor is composed of a track ring 1. The track ring 1 has three internal cams 2, three outlet galleries 3, and three pairs of discharge ports 4, which discharge into the outlet galleries 3. The three pairs of discharge ports 4, are machined on both faces of track ring 1. Also o-ring seal groove 6, is machined on both faces of track ring 1. Track ring 1 has six bolt holes 5, for the assembly through bolt 17.

The unit has a rotor 7, which is a single component comprising both rotor 7 and a shaft 7a. The rotor 7 has a main oil gallery 8, extending from the non-drive end of the shaft to beyond the center of the rotor 7 far enough to feed the flow of high pressure hydraulic oil to the distribution galleries 9, of the rotor 7, and the oil passages 10, of the rotor 7. Rotor 7 also has six slots 11 for vanes and a free moving vane 12 in each slot. The shaft 7a has a step 7b on either side of rotor 7, for inner races of bearings to bear against.

The assembly of the rotor 7 into the track ring 1 creates three hollow chambers 13, between the outer surface of the rotor 7 and the inner surface of the track ring 1 at its larger inside diameter. These chambers 13 and the discharge ports 4, are closed on either side by the inboard surfaces of the wearing plates 14; which are provided to protect the inboard surfaces of the outer side housings 15, of the drive end and 16 of the non-drive end. The whole assembly is held together by the six assembly-through bolts 17, through the six bolt holes 5. So the rotor 7 has six vanes 12 in slots 11, with oil passages 10 serving to maintain a static oil pressure in the slots 11 under the vanes 12 to ensure vane contact at all times with the track ring 1 inside surface. Furthermore the rotor 7 has six distribution galleries 9, which serve to deliver the flow of high pressure hydraulic oil from the main oil gallery 8 to parts of chambers 13 behind the vanes 12.

Hence fast flowing high pressure hydraulic oil throughput entering the main oil gallery 8 and through the distribution galleries 9 arriving at parts of chambers 13 behind the vanes 12; thus pressurizing parts of chambers 13 behind the vanes 12, while parts of chambers 13 ahead of the vanes 12 are depressurized being open to the discharge ports 4; cause the vanes 12 to move by oil pressure differential across the vanes 12, resulting in high speed rotation of the rotor 7; the speed of the rotor 7 being proportional to the volumetric flow rate; and the output torque at the drive end of the shaft 7a being proportional to the pressure of the oil put through the motor. There is continuity of drive since three vanes 12 are being driven in chamber when the other three have gone beyond the discharge ports 4 and exposed the chambers 13 behind them to the discharge ports 4.

The rotor 7 is held true to axis at all times and without axial or radial movement, turning true at all times, held in position by two preloaded angular contact ball bearings 18, in tandem pressed to the shaft 7a on each side of the rotor 7. These are pre-pressed into the two side housings 15 and 16 and then pressed onto the shaft 7a tight against the shaft step 7b on both sides. The bearings 18 are preloaded by pre-loading caps 19 and 20 which are designed to the tolerance necessary to preload the bearings 18 when they are tight against the side housings 15 and 16 respectively, metal-to-metal (i.e. no gasket to compromise the tolerance). Oil is contained by 'O' ring seals in grooves one on each of the bearing caps 19 and 20, and the side housings 15 and 16. The assembly drawing shows the containment of the oil by adequate 'O' ring seals provided at locations convenient for the purpose and by copper washers 21, of the assembly through bolts 17. Furthermore the pre-loading cap 19, carries a special shaft seal 22, which is of such design, that its lip is pressed onto the shaft 7a by inboard oil pressure and is guaranteed by the manufacturers to operate reliably on long term basis at higher pressures and speeds than the operating pressures and speeds of the motors. This seal therefore contains the oil to the unit at the output shaft 7a.

The pre-loading cap 20 on the non-drive end has the hose terminal 26, where the hose of the incoming oil is terminated.

With the pre-loaded angular contact ball bearings 18 preventing any axial movement whatsoever, the center of the rotor 7 is exactly at the center of the track ring 1, therefore a running clearance between rotor 7 and wearing plates 14 can be provided by a tolerance of the width of the track ring 1 to exceed the width of the rotor 7, say by 40 microns, giving 20 microns running clearance on either side of the rotor 7 for example. The same running clearance will apply between the two ends of the vanes 12 which sweep the faces of the wearing plates 14, vane length being equal to rotor width exactly.

The return oil will discharge through the three pairs of discharge ports 4, of the track ring 1, into the three outlet galleries 3, of the track ring 1. The outlet galleries 3 extend through the non-drive end side housing 16, machined through the housing 16 to exit. Hose terminals 23, are provided, and are machined to the side housing 16 at the exit points of outlet galleries 3; where the three hoses (not shown) for the return oil are terminated.

The hydraulic oil put through the hydraulic motor comes from an oil pump. This oil pump could be one of the same units as the hydraulic wheel motor, installed and operated as a pump. The pump may be driven mechanically or electrically. The pump sucks oil from an oil tank, through a filter and delivers oil, at high pressure and fast flow rate, to the main oil gallery 8, by a delivery hose (not shown) terminated to the hose terminal 26 of the pre-loading cap 20. The return oil from the hydraulic motor is taken back to the oil tank, via an oil cooler in the circuit, by return hoses terminated to the hose terminals 23, of the side housing 16, at the exits of the three outlet galleries 3.

Figure 2:
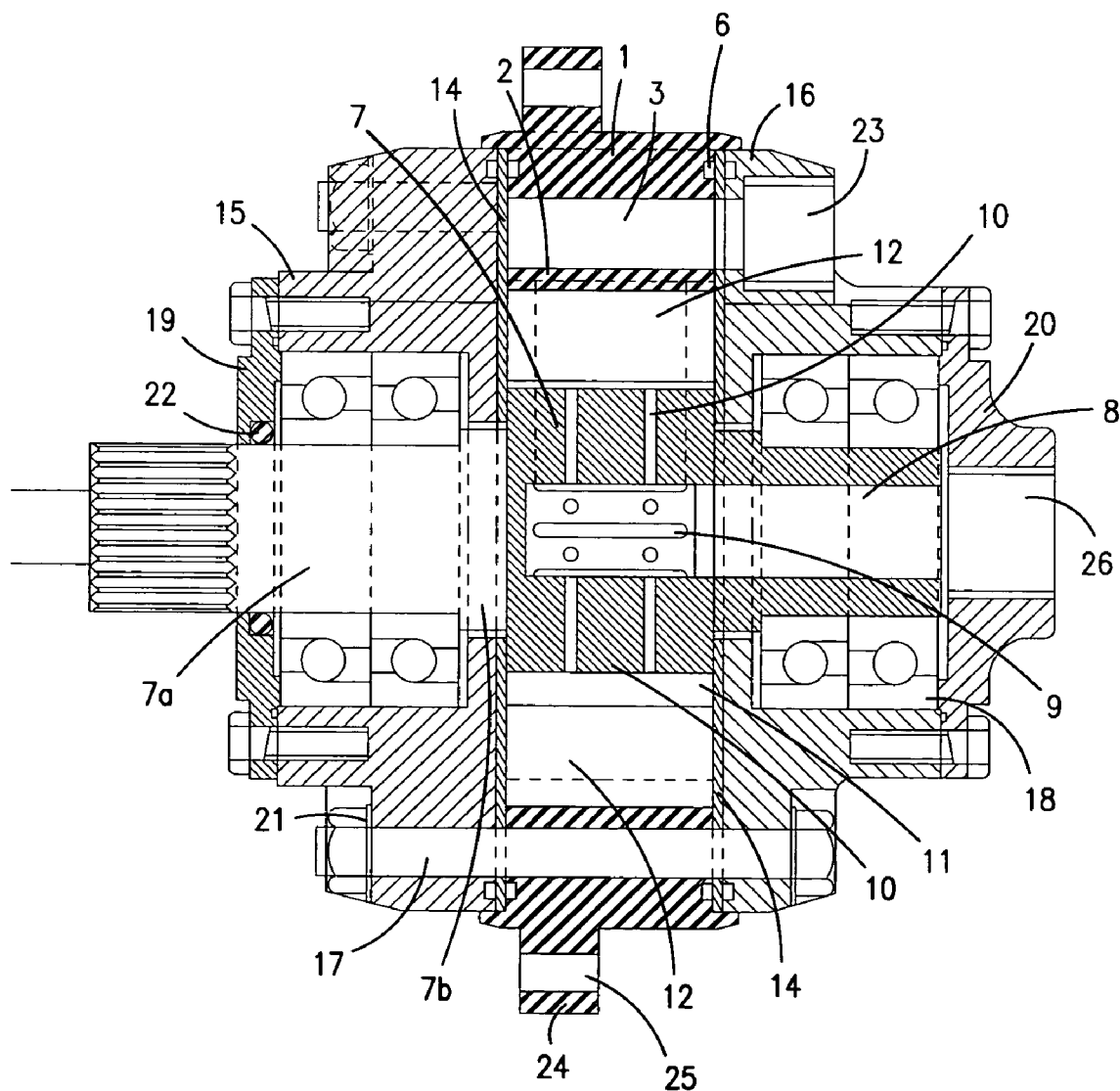
FIG. 2 shows an alternate embodiment of the hydraulic motor of the present invention. The motor is similar to that of FIG. 1, but smaller and more compact for lighter vehicles.

The drive end side housing 15, has a flange 24 with eight bolt holes, which serves to mount the motor, or pumps, to any appliance module or machine, and serves to hold the unit axially correct to the coupling to drive or be driven. While the mounting flange 24 is shown attached to side housing 15, it is possible to place the mounting flange 24 in a variety of places, as best suited for a particular application. It may, for example, be part of the track ring 1 instead of the side housing 15 as in FIG. 2b, which demonstrates versatile design to suite a particular application.

If the flow of oil through the motor is reversed by putting the supply oil through the three return hoses (not shown), the oil will enter the three outlet galleries 3 and flow into the chambers 13 backwards through the discharge ports 4 pushing the vanes 12 backwards thus causing rotation of the rotor 7 in reverse. Oil trapped ahead of moving vanes 12 in this reverse rotation will be forced down the distribution galleries 9 into the main oil gallery 8 and out into the hose which serves as supply hose for the motor during forward operation. In the reverse case, it serves as return hose for the return flow. Hence the motor can be reversed by reversing the flow through the motor which can be accomplished by an arrangement of cross pipes and a complement of solenoid valves in the circuit and without disturbing the installation of the hydraulic piping.

If the hydraulic motor is coupled to an electric motor at its output shaft and spun backwards at a usual electric motor speed of say 1500 rpm, the centrifugal force will push the vanes 12 to contact with the track ring 1 and positive displacement by moving vanes 12, in reverse sense to the motor, will create suction behind the moving vanes 12 in chambers 13, thus oil being sucked into the chambers 13 through the discharge ports 4 backwards and oil trapped in chambers 13 ahead of moving vanes 12 will be forced down the distribution galleries 9 into the main oil gallery 8 and out from hose terminal 26 to a delivery line (not shown) which will deliver the high pressure hydraulic oil flow from the hydraulic motor, now serving as a pump, to any appliance in a general purpose application, which is operated by high pressure hydraulic oil.

Figure 3A:
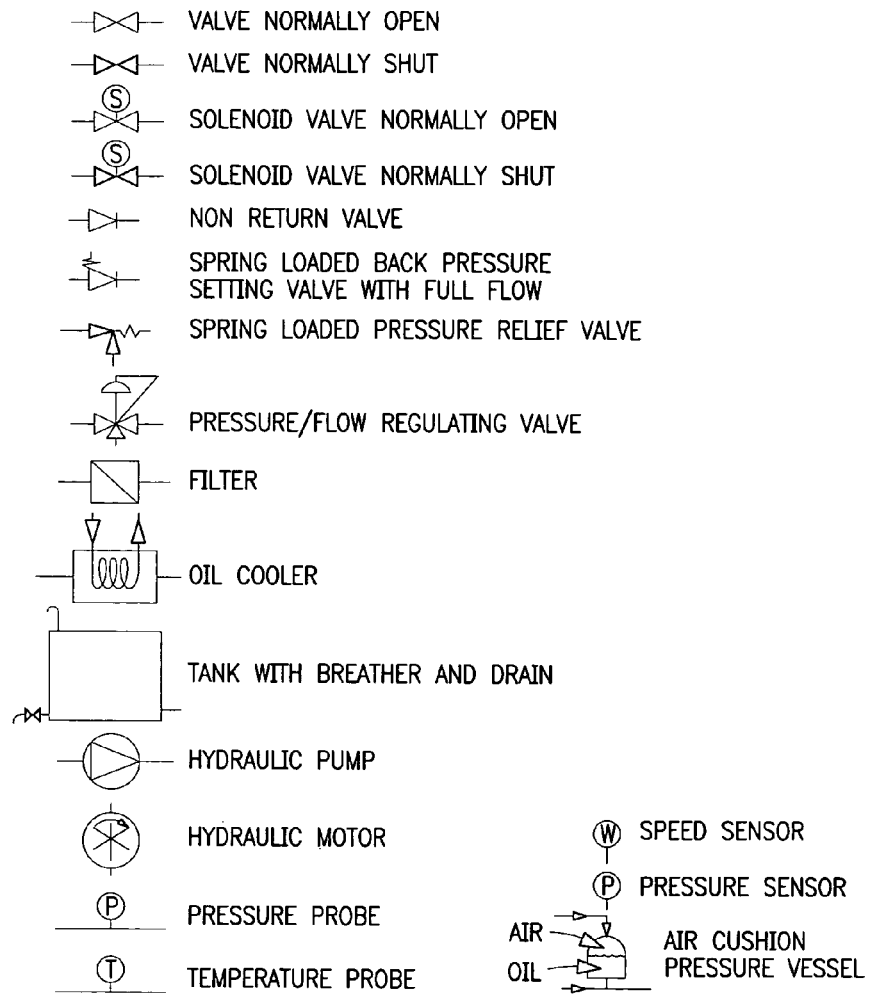
FIG. 3a is a key to symbols used for illustrating the control system of the present invention.
Figure 3A:
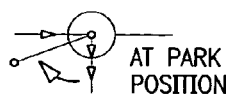
Figure 3A:
Figure 3B:
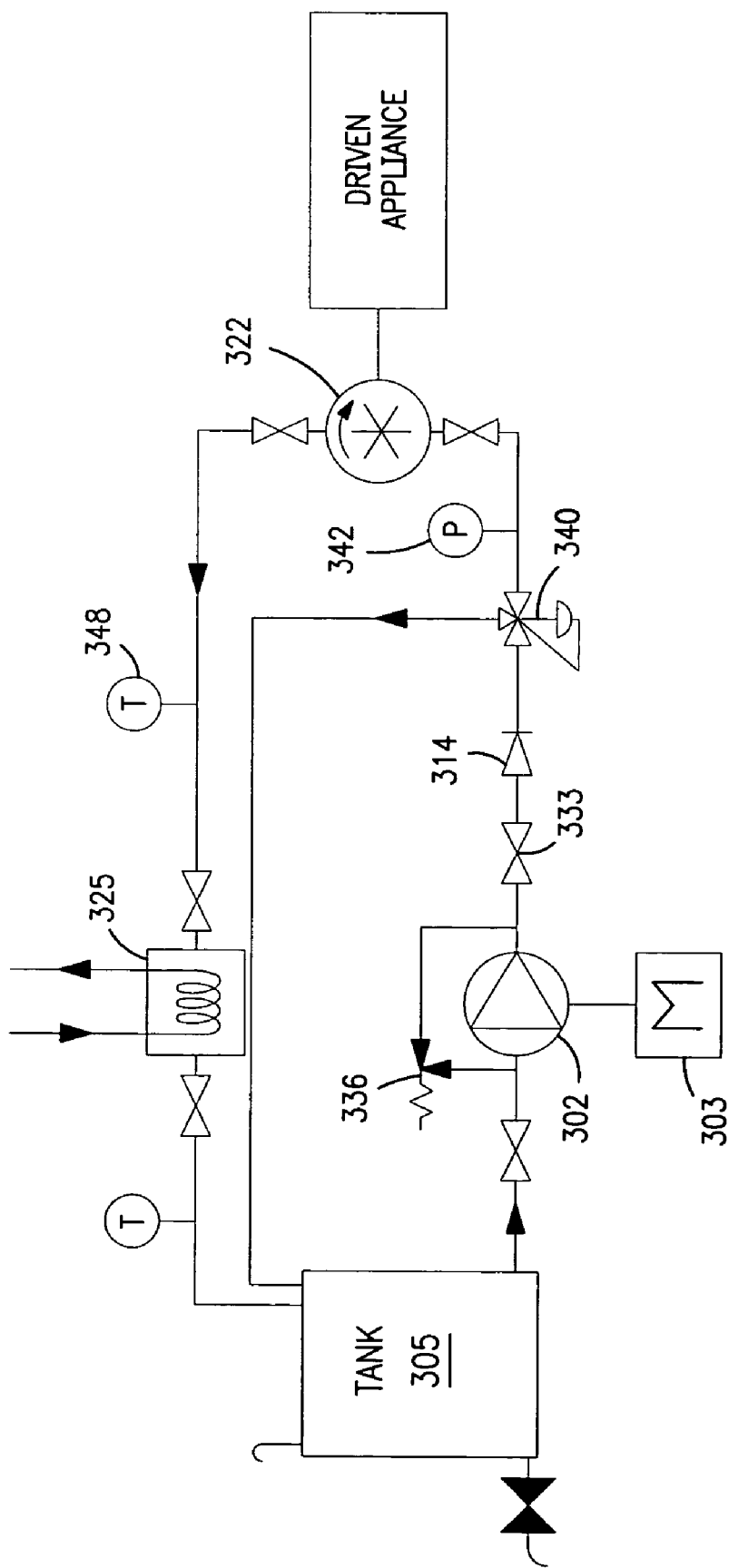
FIG. 3b shows a general configuration for delivering power to a generic appliance.

Installation as a pump means that the suction line from the oil tank to the pump is branched to three short hoses (not shown) local to pump which are terminated to terminals 23 and a delivery line to terminal 26, to deliver to any appliance, which will be operated by the hydraulic oil, and the return oil from such appliance is piped back to the oil tank. FIG. 3b shows a general configuration for delivering power to a generic appliance, such as a winch. Motor 303 serves as a prime mover to drive pump 302, which in turn drives motor 322, which drives the desired appliance.

The control system of the present invention will now be explained. For convenience, the reader may refer to FIG. 3A for a key to the symbols used in the schematic diagram of FIGS. 4 and 5.

Figure 4A:
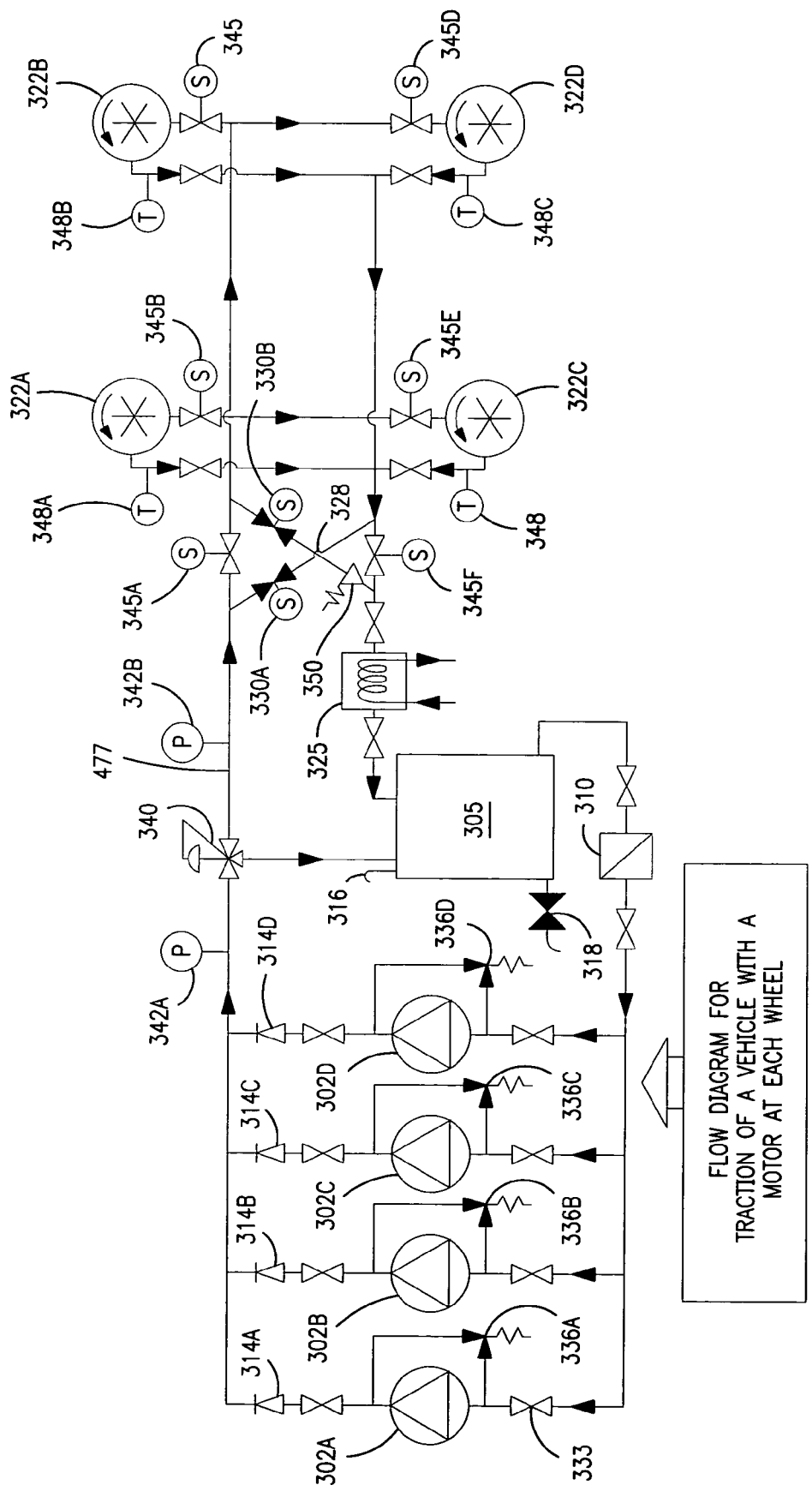
FIG. 4a is a schematic diagram of the hydraulics system of the present invention indicating forward operation.

FIG. 4A shows four engine driven pumps, referred to as 302A-302D, which draw hydraulic oil from an oil tank 305 through a filter 310 and pump the oil through non-return valves 314A-314D to a common delivery line 477. The oil tank 305 has a breather tube 316 to the atmosphere, and a drain 318. The system also comprises four motors 322A-322D, one at each wheel of the vehicle, oil cooler 325 and a cross pipes system 328. The cross pipes system 328 has a compliment of cross pipe solenoid valves, 330A and 330B, which serve to reverse the flow down stream of the cross pipes system 328 in order to reverse the motors 322A-322D to reverse the vehicle.

All units such as pumps, motors, filter and cooler have a normally open valve (generally indicated as 333), on either side of unit, which serve to isolate each and every unit for maintenance or replacement, without draining the system.

The four engine driven pumps 302A-302D are protected by local to pump spring loaded relief valves, 336A-336D, which relieve flow from delivery side to suction side of each pump to protect the pumps 302A-302D from extreme pressures which could arise from time to time, like failure of the main pressure regulating valve 340 where the system maximum pressure is set; the excess flow being diverted back to the tank 305 from here; or by acute blockage of flow if piping is crushed in an accident and such like.

The flow goes through a main pressure regulating valve 340, which has pressure probes, 342A and 342B, on either side, and is delivered to the motors 322A-322D at each wheel through two solenoid valves both normally open, one between the cross pipe terminals to delivery line 345A and one near the entry point of each of the motors, 345B-345E. The flow goes through the four motors 322A-322D, driving the motors in a sense which drives the vehicle forward. The discharge from the motors goes into the common return line which goes through a solenoid valve 345F, normally open, between the terminals of the cross pipes to the return line, and through oil cooler 325 back to the tank 305.

Temperature probes 348A-348D are provided to the discharge lines immediately down stream of the motors 322A-322D to warn the operator if any of the motors 322A-322D are overheating. The solenoid valves 345B-345E at the entry point to the motors 322A-322D serve to isolate the motor of a spinning wheel in soft mud diverting the drive to the non spinning wheels, any excess flow thus created being relived to the tank 305 at the system pressure-regulating valve 340 where the maximum operating pressure is set.

If the actuation signals for controlling solenoid valves 345B-345E are controlled via buttons accessible to the driver, then the driver, by the touch of a button, can close the solenoid valve 345 to isolate a spinning wheel or wheels in mud; for non-spinning wheels to move the vehicle. Introducing one single function PLC and four speed sensors one per wheel can automate this. The PLC will monitor wheel speed. Upon detecting a wheel speed rise at one or more wheels which exceed the ratio of speed difference of inboard and outboard wheels when cornering; ratio is constant irrespective of vehicle speed while cornering; the PLC will instigate the closing of solenoid valve 345 for a few seconds and open again. The process will repeat until the vehicle is out of the mud.

The solenoid valves 345B-345E will also serve to isolate the motors for maintenance together with ordinary valve, normally open, 333 on the discharge side of the motor. All valves 333 are locked open and must be unlocked for maintenance.

Figure 4B:
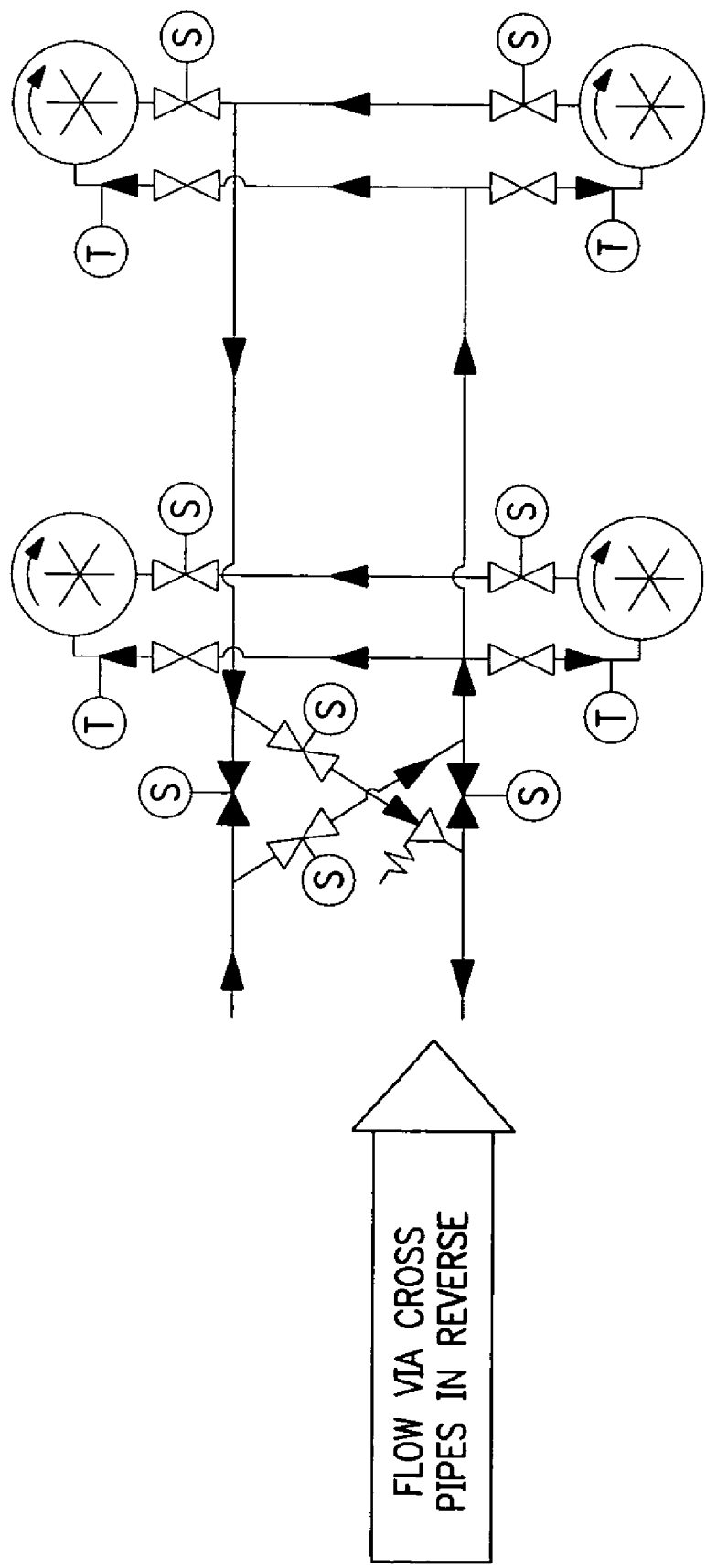
FIG. 4b is a schematic diagram of the hydraulics system of the present invention indicating reverse operation.

Reversing the motors will reverse the vehicle. This is accomplished by changing the configuration of the cross pipes system 328. For reverse operation, the supply line solenoid valve 345A and return line solenoid valve 345F will shut and the cross pipes solenoid valves 330A and 330B, will open. This will reverse the flow to the motors 322A-322D at the wheels, thereby reversing the vehicle. The return cross pipe has a back pressure setting valve 350 to facilitate the setting up of sufficient back pressure to maintain adequate static pressure under the vanes 12 of motors 322A-322D to maintain contact of vanes 12 with track ring 1. This back pressure will reduce the efficiency of a motor in reverse by a negligible amount. FIG. 4B illustrates the cross pipe system during reverse operation.

Figure 5:
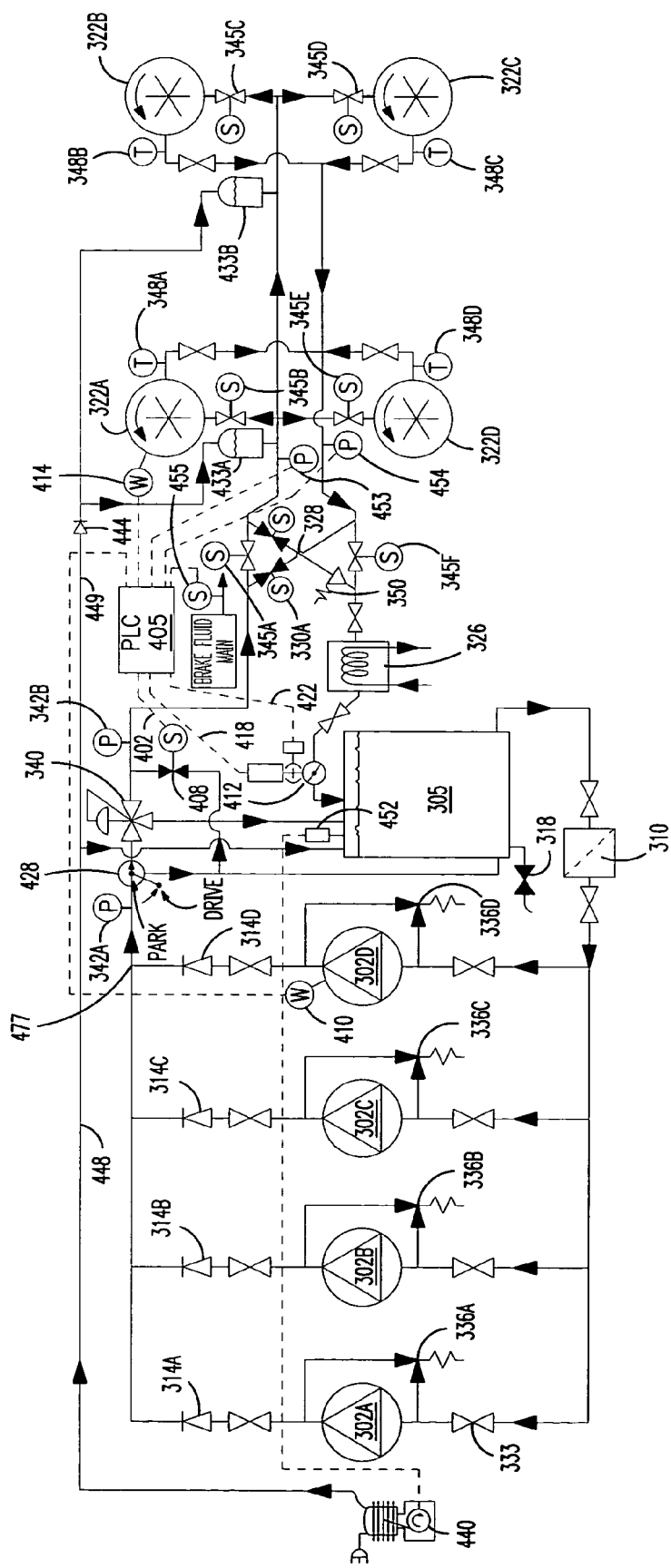
FIG. 5 is a schematic diagram of the control system of the present invention. In this diagram the schematic diagram of FIG. 4a is converted to a pressurized closed circuit system.

FIG. 5 is a schematic diagram of the control system of the present invention; which utilizes a pressurized closed circuit version of the diagram in FIG. 4a. Without such a control system in place, the performance will be suboptimal. For example, during acceleration, the pumps 302A-302D are operating at a faster speed than the wheel motors 322A-322D. In this case, a high pressure situation will form, causing excess oil to be relieved back to the tank 305 until motor speed increases sufficiently to reduce pressure, to below the setting of system pressure relief valve 340 and then the system will settle into a new equilibrium state.

Furthermore, during deceleration, the motors 322A-322D are motored by the vehicle's inertia at a faster speed than the pumps 302A-302D, while the engine (not shown) that is driving pumps 302A-302D is at idling speed. In this case, oil starvation may occur at the motors 322A-322D. At this moment, the wheel motors 322A-322D may be going at 600 rpm, and the pumps may only be at 150 rpm. Therefore, there is a considerable discrepancy between the motor speed and the pump speed during this situation, the pumps 302A-302D are unable to deliver the volumetric flow rate needed for the motors 322A-322D to run full, hence oil starvation and cavitations will occur.

The control system of the present invention alleviates these problems. Also by restricting the flow of the return just before the tank 305, a negative torque is created at the motors 322A-322D. This emulates the "kinetic braking" that happens with a conventional mechanical transmission. This is a desirable feature for a predictable driving experience.

As part of the control system of the present invention, both pump speed and wheel motor speed are monitored. This is accomplished with pump speed sensor 410, and motor speed sensor 414. Speed sensors 410 and 414 provide a speed indication to PLC 405. While only pump 302D is shown with a speed sensor 410, it is possible to provide speed sensors on multiple pumps. Likewise, only motor 322A is shown with a speed sensor 414. However it is possible to have speed sensors on multiple motors. The control system utilizes a programmable logic controller (PLC) 405. The PLC 405, upon detecting a rapid drop in pump speed, while the wheel motor speed remains high, can activate deceleration signal 402. The deceleration signal 402 will open the normally closed solenoid valve 408. This will allow oil to be drawn from the supply tank 305 to feed the demand of the wheel motors 322A-322D for full flow, thereby avoiding oil starvation and cavitations. As a backup the PLC 405 is also constantly monitoring delivery and return line pressures through signals from sensors 453 & 454, and will activate deceleration signal 402 when it detects a large pressure drop in the delivery line without an appreciable change in the return line at the same instant.

In a preferred embodiment, signals from the PLC 405 do not control the solenoids directly. Instead, low voltage signals from the PLC 405 operate a transducer or relay (not shown) to supply the 12V from the vehicles main to operate the solenoids of the various solenoid valves.

In order to provide an additional braking effect, a butterfly valve 412 is placed in the return line, preferably just before the tank. The butterfly valve 412 has the feature of being able to be moved to a partially closed position, and maintained in that position via a motor control signal 418 and a brake control signal 422 that control a motor and brake within the butterfly valve. The PLC 405, upon detecting a drastic fall in pump speed with motor speed unchanged, begins to slowly close the butterfly valve 412, while monitoring return line pressure. Initially the return line pressure will be fairly low, since the oil is not impeded on its way back to the tank 305. However, as the butterfly valve 412 closes return line pressure will increase. When the return line pressure reaches a predetermined threshold, the butterfly valve 412 will be held in that position. The backpressure thus set up in the return line will put a negative torque on the rotors of the wheel motors 322A-322D that will serve to assist the vehicle brakes to slow the vehicle. As the wheel motors 322A-322D slow with the slowing down vehicle the oil throughput from the wheel motors to the return line will diminish, resulting in a fall of backpressure. But the PLC 405 will detect that from signals coming from pressure sensor 454 in the return line and will instigate further closure of the butterfly valve to compensate and to hold again. Thus the PLC automatically adjusts the butterfly position to maintain the predetermined backpressure through braking. Once the vehicle brake is released, the butterfly valve brake signal 422 is cancelled, and the valve opens allowing unrestricted flow back to the tank 305. For this the PLC receives signals from a sensor 455 at the vehicle's brake servo mechanism which tells the PLC when the brakes are on or off. The butterfly valve brake signal 422 is also cancelled at any moment the PLC 405 senses a rise in pump speed.

In a preferred embodiment, sensor 455 could either be a pressure sensor monitoring brake oil pressure or a motion sensor monitoring movement and direction of the servo actuated brake fluid pump piston rod.

When the vehicle is brought to a complete stop, the return line pressure will approach zero. In this case, the butterfly valve 412 will return to the fully open position. The bypass valve 408 will also remain in the open position for oil from pumps to flow back to the tank during engine idling. As soon as the vehicle operator applies throttle, the PLC 405 detects the increase in pump speed via speed sensor 410, and closes the bypass valve 408, forcing the pumps 302A-302D to drive the wheel motors 322A-322D and move the vehicle. The PLC will also do that as soon as it detects a pressure increase from signals of sensor 453 as a backup.

A lever is provided which the operator will shift to Park position and apply the parking brake (not shown). The lever diverts all flow to re circulate through the tank, bypassing everything by manual operation of the three way valve 428, so that there is no propulsion oil to the motors; oil re circulates to the pumps with the engine idling at Park position until engine is switched off and again when restarted. This does not lock the vehicle, like it would on an automatic transmission, and a parking brake must be applied.

The driver will shift lever to the Drive position for propulsion to begin to move the vehicle.

If the operator applies full throttle while the vehicle is stationary, high pressure will be quickly built up in the delivery line. This is because the pumps 302A-302D increase in speed quickly as the throttle is applied, but the wheels can not instantly spin at the same rate. Hence high pressure will build up. This causes the main pressure relief valve 340 to open at system maximum pressure setting, sending excess flow back to the tank 305, whilst maintaining maximum pressure in the system for propulsion. As the wheel motors 322A-322D start to spin, and reach a speed at which the delivery line pressure drops below the maximum pressure setting, the main pressure relief valve 340 closes, and the hydraulic system settles to an equilibrium state.

Momentary high-pressure situations can also occur with road surfaces that are not smooth. In this case, a wheel that encounters a pothole or rut may momentarily skid at near zero speed. This creates a shock wave which exceeds the pressure setting of the main pressure relieve valve 340. The main pressure relief valve will then open, to stabilize the system. To provide additional protection, each pump has its own pressure relief valve 336A-336D, set at a slightly higher pressure than the setting of the main pressure relief valve 340. If there is a failure of the main pressure relief valve 340, the pump pressure relief valves 336A-336D will activate to prevent damage to the system.

Because the control system takes a finite amount of time to detect a condition and take the appropriate action, there may still be situations where there are shocks to the hydraulic system, preventing a smooth ride of the vehicle.

To assist in providing a smooth ride, pressure vessels 433A and 433B are connected to the delivery line. The pressure vessels 433A and 433B provide an air cushion that compresses to reduce the shock. The cushion by expanding provides oil feed for the wheel motors to run full when delivery line pressure drops when pumps fall to idling speed. The hydraulic oil enters the pressure vessels 433A and 433B from the bottom at high pressure. This compresses the air at the top of the pressure vessels 433A and 433B. This serves to absorb shock waves that may occur during vehicle operation. The pressure vessels 433A and 433B need only provide system damping or oil feed for about three seconds. This is because the PLC 405 can detect and react to the pressure condition in less than two seconds.

Air cushion vessels loose the air over time. This is because, under pressure, miniature bubbles form in the fluid, and escape with the fluid. A small compressor 440 is used to replenish the air cushions when necessary. An air main 448 from the compressor 440 is connected to the top of tank 305 A branch 449 from that main 448 is connected to the pressure vessels 433A and 433B. The branch 449 has a non-return valve 444 inline just upstream of pressure vessels 433A and 433B.

When the vehicle is started, compressor 440 will pressurize the tank 305 and pressure vessels 433A and 433B to approximately 2 bar. When the vehicle is driven, the air cushions will be compressed to the pressure of the oil, which propels the wheel motors 322A-322D. The high pressure remains downstream of non-return valve 444. The tank 305 is not affected. If air pressure at pressure vessels 433A and 433B drops below the 2 bar tank pressure setting while the vehicle is at rest and idling, air from tank 305 will flow to pressure vessels 433A and 433B. Pressure switch 452 will detect the air pressure drop at tank 305, and activate compressor 440 to pressurize the pressure vessels 433A and 433B and the tank space above the level of oil; which is unchanging in a pressurized closed circuit system; to the 2 bar setting level. When the 2 bar tank pressure are restored, the pressure switch 452 de-asserts its signal, and compressor 440 stops.

Figure 6:
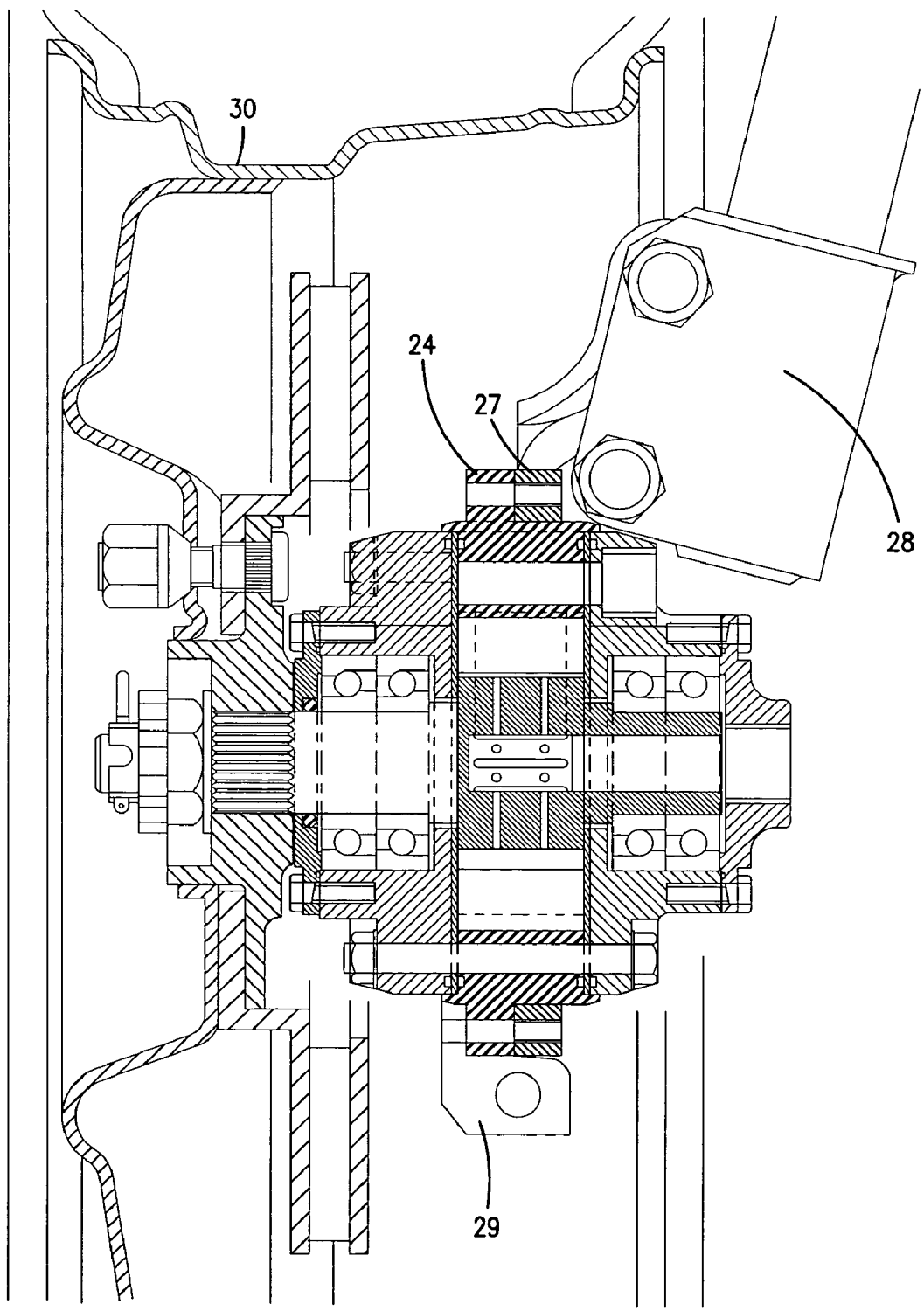
FIG. 6 shows the hydraulic motor of the present invention mounted to the wheel of a vehicle.

FIG. 6 shows the hydraulic motor 322 of the present invention mounted to the wheel 30 of a vehicle. Item 28 is the vehicle's hung down rod suspension which must be equipped with a rigidly welded flange 27, to mate with the motor's mounting flange 24. Flange 27 must be very strongly rigidly fixed to the suspension; such that when the motor's mounting flange 24 is bolted tight to it, the axis of the shaft 7a of the motor 322 must be true to the cumber and caster and toe in related orientation of the wheel 30, also that wheel geometry of the vehicle is unchanged.

At the bottom of the motor 322, and attached to flange 24, is a bracket with the tapping for the vehicle's steering track rod ball joint stub, referred to as stub holder 29. The hose terminal 23 is seen obstructed for fitment of hose. If the mating flanges 24 and 27 are turned clockwise looking from the non-drive end of the motor 12, the bolt hole 25 on the top moves to a position so that it is on a horizontal line with the next bolt hole 25 coming upwards, the hose terminal 23 will move well out into the open so that all hose terminals are accessible, and the flange 27 welded at that position, to the suspension.

Figure 7A:
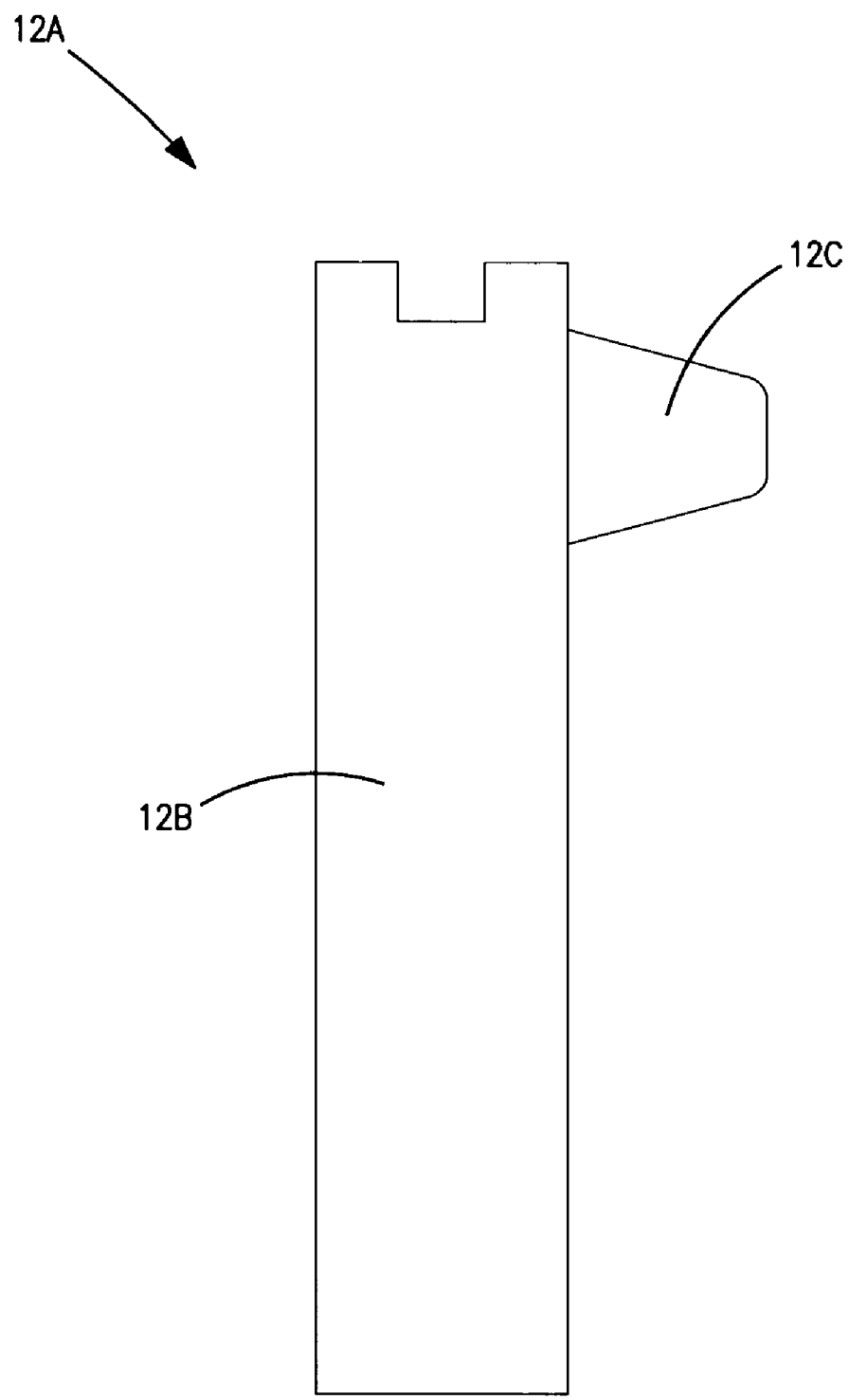
FIG. 7A shows an integrated vane/valve in accordance with an additional embodiment of the hydraulic motor of the present invention.

FIG. 7A shows an integrated vane/valve 12A in accordance with an additional embodiment of the hydraulic motor of the present invention. Integrated vane/valve 12A comprises vane portion 12B, and valve portion 12C.

Figure 7B:
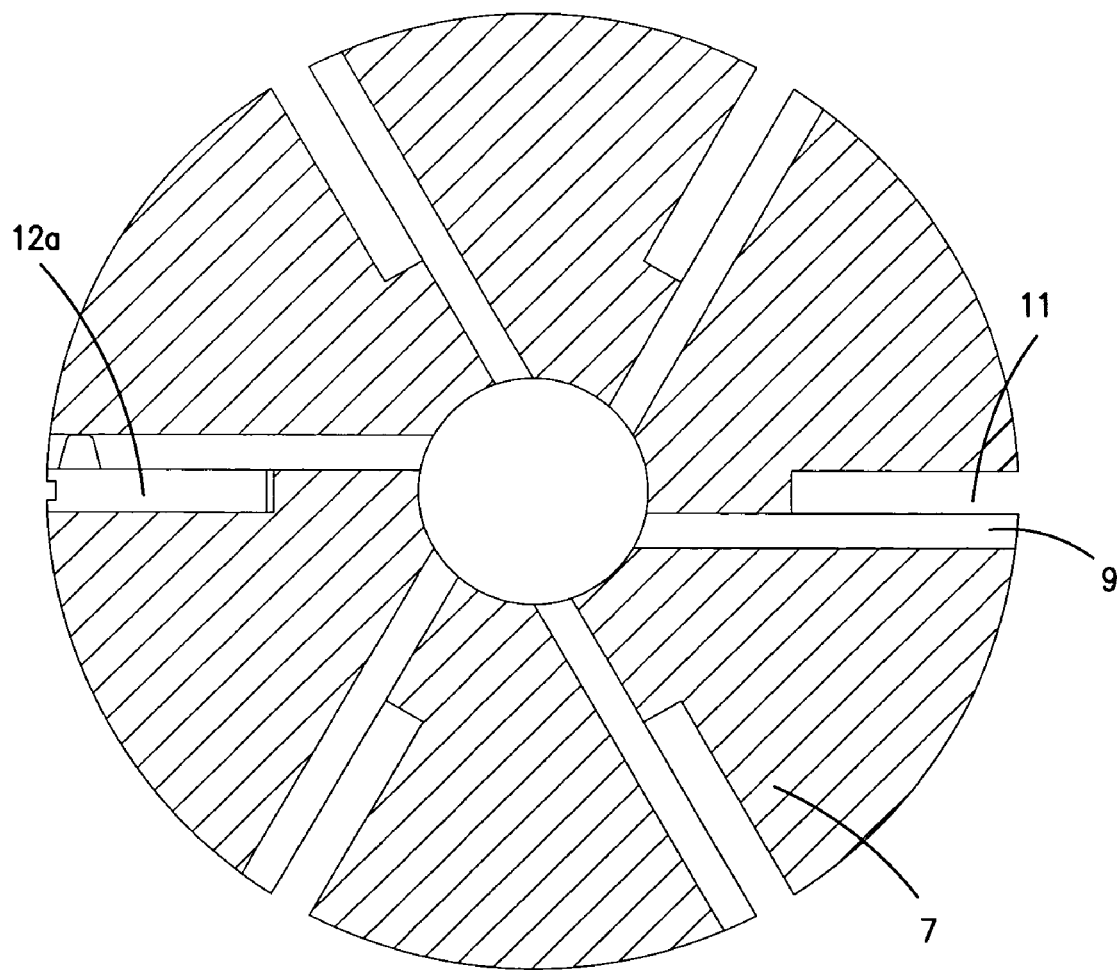
FIG. 7B shows a rotor that utilizes the integrated vane/valve, in accordance with an additional embodiment of the hydraulic motor of the present invention.

FIG. 7B shows a front view of a portion of an additional embodiment of the hydraulic motor of the present invention, indicating the rotor 7. FIG. 7B shows distribution galleries 9 and vane slots 11 adjacent with the hollow parts of both combined. In this embodiment, rotor 7 comprises combined vane/valve 12a. This differs from the embodiment of FIG. 1A, in that the vane 12 of FIG. 1A has been modified to have an integral valve portion (see 12C of FIG. 7A).

The object for the above modifications is that; while in the embodiment shown in FIG. 1A, three vanes 12 are driven in chambers 13 by fast flowing hydraulic oil throughput at high pressure entering the chambers 13 through the distribution galleries 9, the other three vanes 12 have exposed the discharge ports 4; hence the distribution galleries 9 immediately behind those are exposed to discharge into the discharge ports 4, through an angle of rotation of 22 degrees, in the existing design of the above patent as it stands. This at high speed of rotation, like 1500 rpm for example, will cause a momentary pressure drop after which the pressure will be reinstated, because the vanes in chambers are driven through a displacement angle of rotation of 60 degrees. Such pressure drop; however momentary at such high speeds; over a 22 degree rotation in the middle of vanes being driven through a 60 degree rotation per chamber per vane; will result in a pressure fluctuation which also generates a hydraulic vibration, that would reduce the efficiency of the hydraulic motor both in motor mode and pumping mode.

With the embodiment shown in FIG. 7B, the vane/valve 12a serves to shut the exit of the distribution gallery 9, preventing oil discharge from gallery to discharge port during the said exposure, thus preventing such pressure drop, and hydraulic vibration and their adverse effects on performance. This embodiment eliminates the need for the oil passages 10 of FIG. 1a, thereby simplifying the design and manufacture of this embodiment.

Figure 8A:
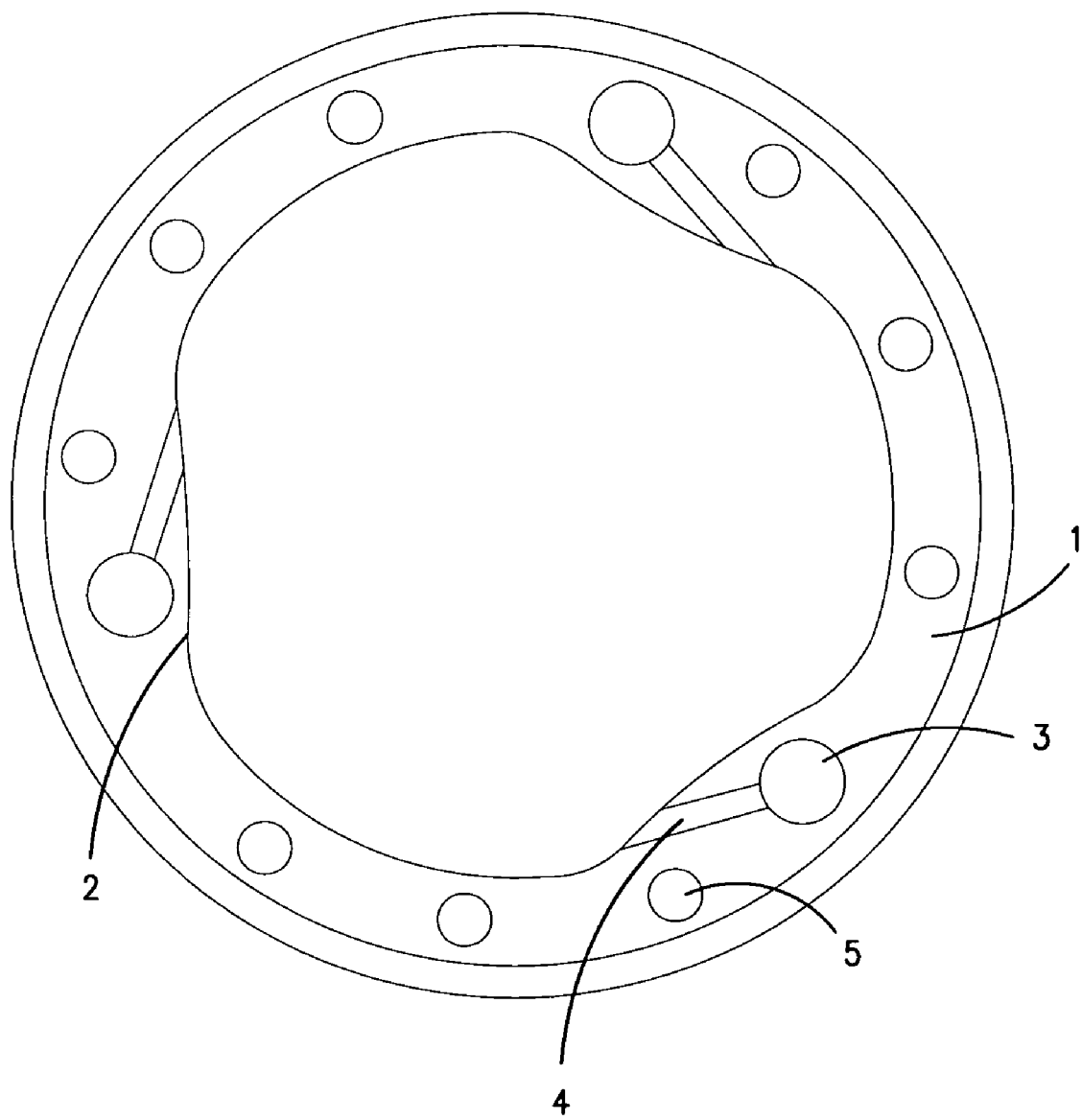
FIGS. 8A and 8B show another embodiment of the hydraulic motor of the present invention.
Figure 8B:
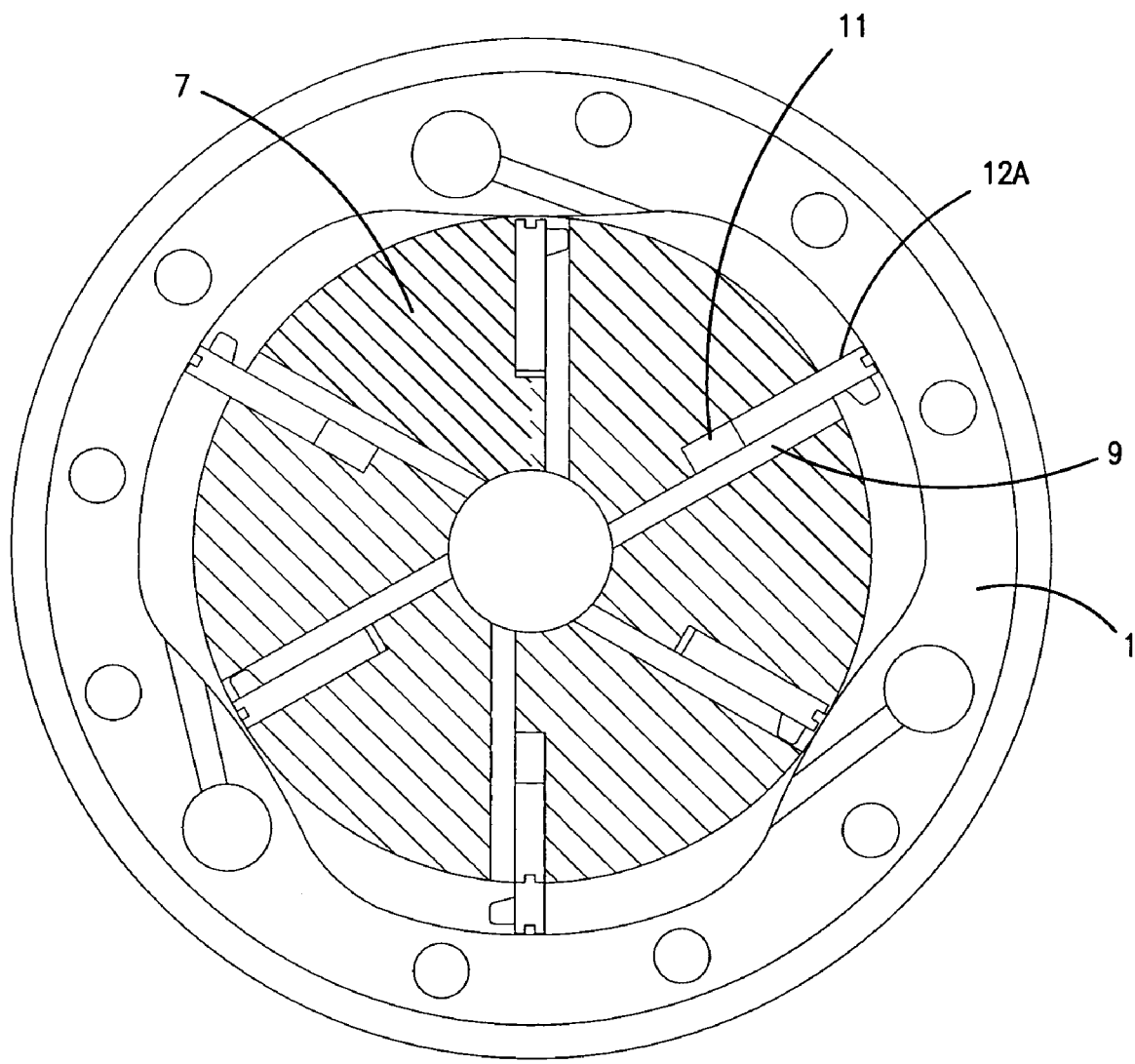

FIGS. 8A and 8B show a redesigned track ring 1 where the outlet galleries 3 have been moved closer to the internal cam centerline by 5 degrees and the discharge ports 4 reoriented accordingly. This serves to shut the exits of the distribution galleries 9, when the vane portions are pressed back into the vane slots 11, by the internal cams 2, as they sweep the inside face of the internal cams 2.

Therefore, the exposure of distribution galleries to discharge ports has dropped to 16 degrees, despite that the galleries are now shut off during such exposure. Also the geometry of the assembly bolt holes 5 and their numbers have changed. FIG. 8B shows rotor 7 in track ring 1 with vane/valves 12A in position.

Figure 9A:
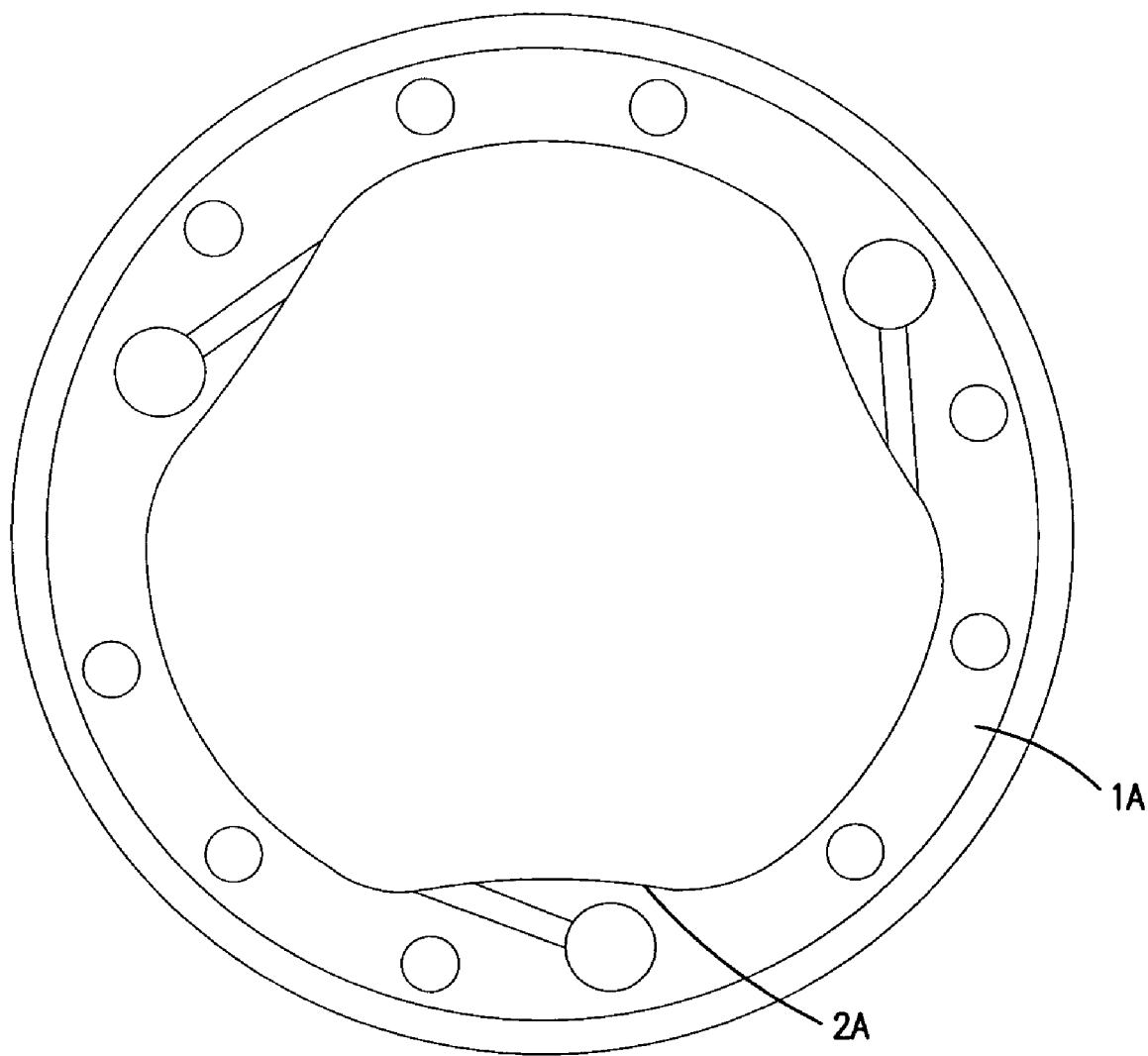
FIGS. 9-10 show yet another embodiment of the hydraulic motor of the present invention.

FIG. 9A shows an alternative and optional track ring design 1A with its internal cams 2A convex towards the center as opposed to the concave internal cams 2 of FIG. 1A. The angle of rotation of said exposure to discharge ports has dropped to 9 degrees with the convex cams.

Figure 9B:
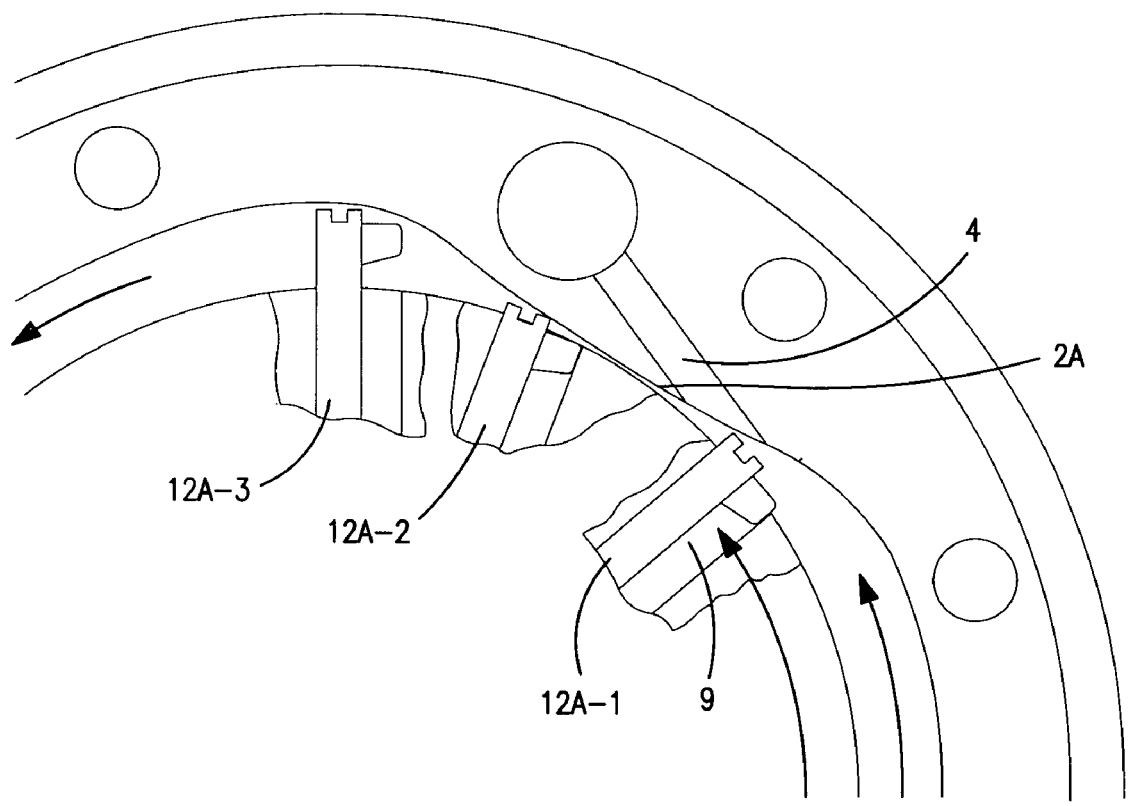
Figure 10:
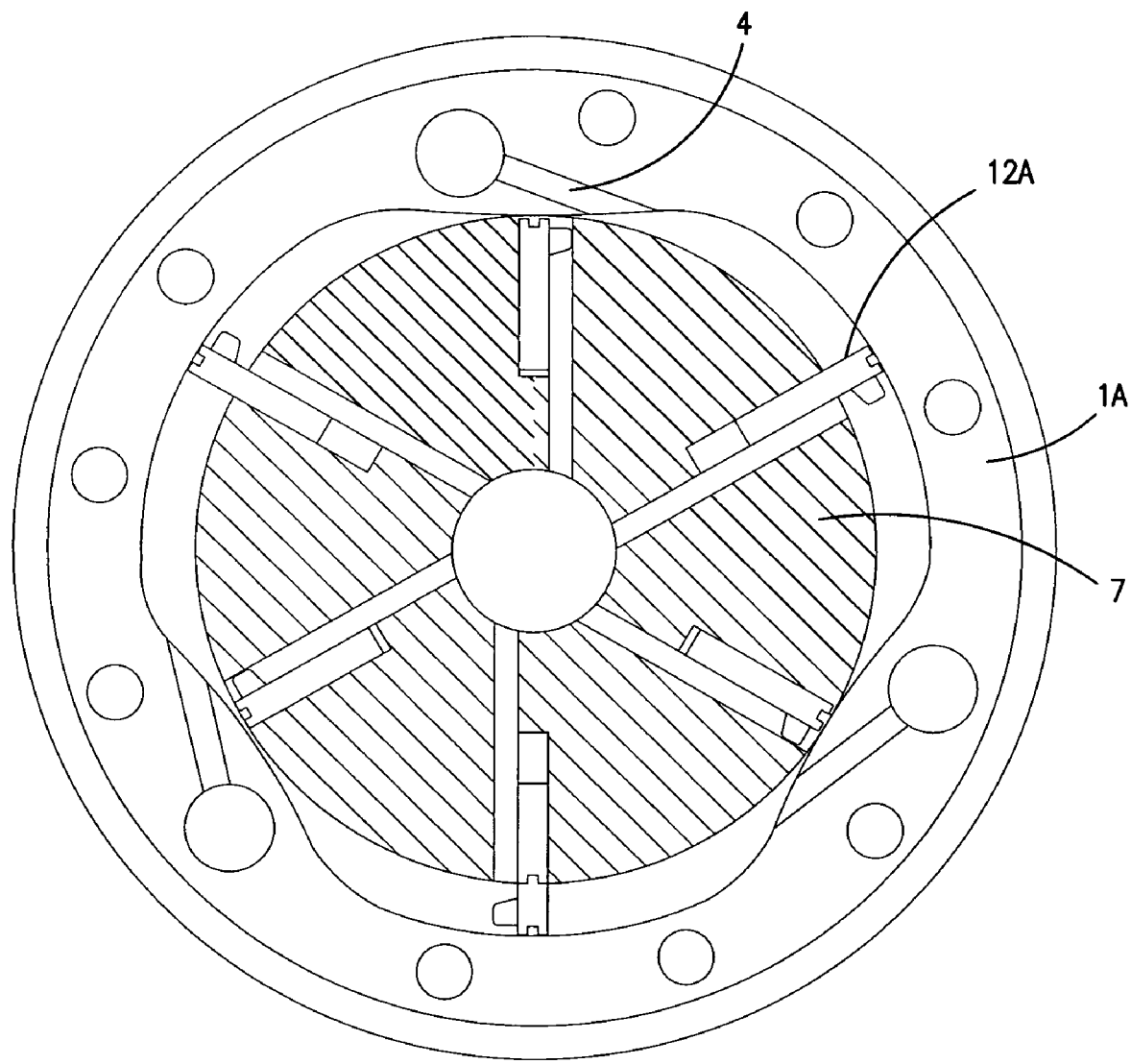

FIG. 9B shows a development of the movement of the vane/valve 12A across the inside face of the internal convex cam 2A, where the shutting of the exit from distribution gallery and the opening of same is seen. Vane/valve 12A is illustrated at three positions, indicated as 12A-1, 12A-2, and 12A-3, respectively. The first position is 12A-1, showing the position of vane/valve 12A as it approaches convex cam 2A. The second position is 12A-2, showing the position of vane/valve 12A as it is compressed by convex cam 2A. Vane/valve 12A proceeds to the next convex cam 2A, and the process continues. Note that position 12A-1 illustrates that the gallery 9 is sealed by vane/valve 12A before the exposure of the discharge port 4 begins. FIG. 10 shows the assembly of rotor 7 and vane/valves 12A in the convex track ring 1A.

Accordingly, the reader will see that the present invention provides an efficient means for implementing a hydraulically powered vehicle. Although the descriptions above contain many specific details, these should not be construed as limiting the scope of the invention, but merely as providing illustrations of some of the presently preferred embodiments of this invention. Thus, the scope of the invention should be determined by the appended claims and their legal equivalents, rather than by the examples given.

What is claimed:

1. A hydraulic motor comprising a rotor, said rotor having a plurality of vanes slideable in slots, said rotor being free turning inside a track ring, thereby forming a plurality of hollow chambers separated by a plurality of internal cams of said track ring, the surface of said internal cams having a running clearance to the outer surface of said rotor, whereby a running clearance is formed between said rotor and the internal cams, a plurality of distribution galleries in said rotor communicating with a main oil gallery and chambers having discharge ports in said track ring, said vanes having an integral valve portion operable between an outer position permitting flow of oil through the distribution galleries and a sealed position when pressed into its vane slot by internal cams of the track ring as it sweeps said cams to shut off flow of oil from the distribution galleries.

2. The hydraulic motor as claimed in claim 1, wherein the internal cams of the track ring are concave towards the axis of rotation of the rotor.

3. The hydraulic motor as claimed in claim 1, wherein the internal cams of the track ring are convex towards the axis of rotation of the rotor.

* * * * *